United States Patent [19]
Yamauchi

[11] Patent Number: 4,569,614
[45] Date of Patent: Feb. 11, 1986

[54] COUPLING

[76] Inventor: Yukio Yamauchi, 27-16 Kugahara 1-chome, Ota-ku, Tokyo-to, Japan

[21] Appl. No.: 393,612

[22] Filed: Jun. 30, 1982

[51] Int. Cl.⁴ .............................. B25G 3/00; F16B 2/02
[52] U.S. Cl. ...................................... 403/352; 403/372
[58] Field of Search ......................... 403/351, 372, 352

[56] References Cited
U.S. PATENT DOCUMENTS
3,017,210 1/1962 Palm ..................................... 403/351

Primary Examiner—Andrew V. Kundrat
Attorney, Agent, or Firm—Birch, Stewart, Kolasch & Birch

[57] ABSTRACT

A coupling for fastening two members whose opposed faces keep an equal gap and are free to relatively displace to the left or right, wherein a wedge inclining with an angle narrower than the friction angle to osculate each of the opposing face of the members, is capable of wedging the opposing faces by relative displacement of the members toward the rising side of the wedge. The coupling is arranged on the left and right respectively in the direction of relative displacement of the members, so that two members can be coupled plainly, rigidly and free from lowering of the axis strength, permitting an easy phase adjustment or dividing or the like.

1 Claim, 17 Drawing Figures

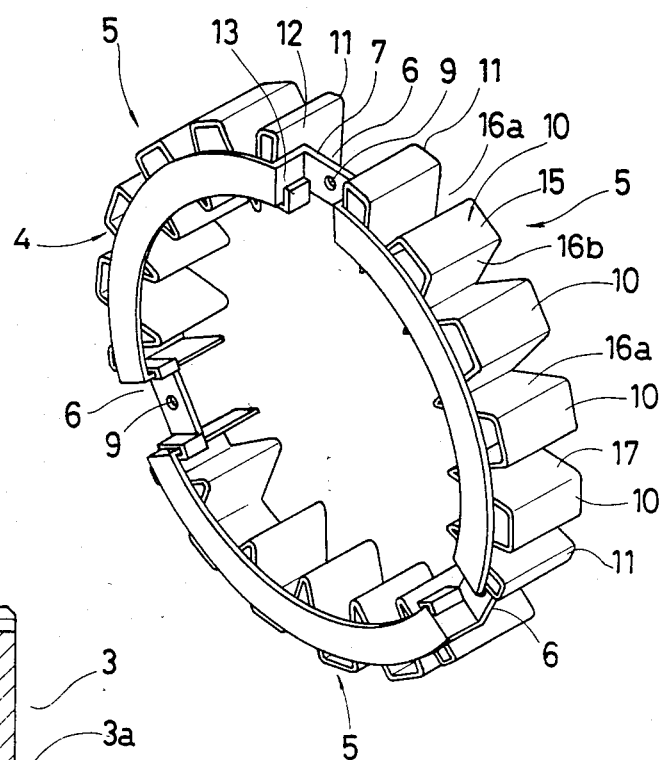
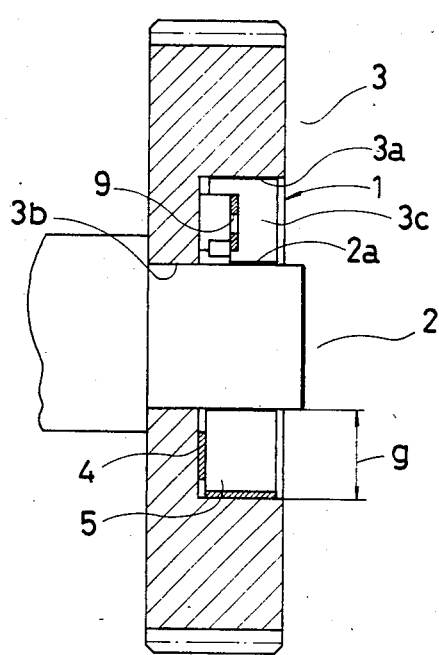

COUPLING

BACKGROUND OF THE INVENTION

The present invention relates to a coupling for use to join two members. More particularly, it relates to a coupling having a wedge part capable of wedging relative displacement of the two members to the left or right so that the two members can be coupled plainly, firmly and economically.

Hitherto, means to couple by impeding relative displacement between one member such as a rotating axis for instance and the other engaging member such as a gear, chain wheel or pulley, involves a keying or splining process, or interference by force fit or shrinkage fit. However, the processing of key seating or spline milling has a disadvantage of involving elaborate work and lowering of the strength of materials, and particularly, such processing is not applicable if a rotating axis comprises a hollow shaft of a thin wall. Furthermore, in case a phase adjustment or dividing between one member such as the rotating axis and the other member is required, the process and assemblage become much more intricate, lowering the efficiency of the operation. In addition, firm coupling is unexpected from the force fit processing due to a danger of a bite, and fixing by shrinkage fit is not applicable to assembly-line production. The coupling method involving such an interference also encounters a problem of lowering of the axis strength in proportion to an increase in interfering intensity.

There is a known coupling which comprises, as shown in FIG. 17, two concentric circular rings a and b having hill-shaped tapers on the faces facing each other with the gap increasing toward both sides, and two wedge-like ring bodies c and d which engage the tapered faces from both sides, being pushed in between the circular rings a and b with a bolt e so that the circular ring bodies a and b dilate out in the radial direction. However, a coupling of this kind is costly in addition to the disadvantage that fitting work requires a great deal of care, because coupling depends on the frictional force between the circular rings a and b and the coupling members, and the ring bodies must be pushed in evenly along the whole circumference to avoid eccentricity.

It is an object of the present invention to provide a low cost coupling of a plain construction.

A further object of the present invention is to provide a coupling which permits an easy phase adjustment and dividing as well as plain fitting.

A still further object of the present invention is to provide a timesaving coupling which requires no grooving processes or the like.

Another object of the present invention is to provide a coupling capable of clutching two members which relatively displace in parallel in addition to the members being turnable relative to each other.

SUMMARY OF THE INVENTION

In accordance with the present invention, there is provided a coupling, having a wedge on the left and right capable of plainly and rigidly coupling two members without lowering the strength of an axis, and of permitting a plain phase adjustment and dividing as well as easy fitting.

BRIEF DESCRIPTION OF THE DRAWINGS

FIG. 1 is an oblique view showing an embodiment of a coupling according to the present invention;

FIG. 2 is a sectional view showing an instance of fitting the coupling of FIG. 1;

DETAILED DESCRIPTION

Figure 3:
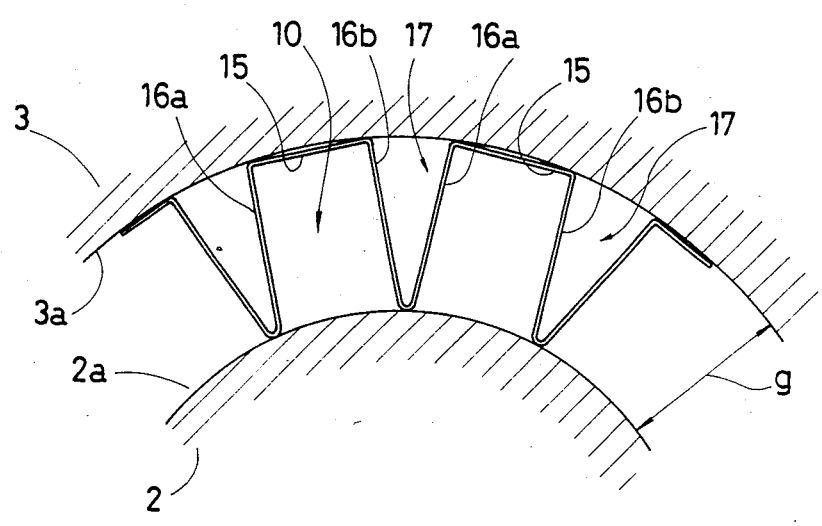
FIGS. 3 and 4 are sectional views minutely showing the U-shaped part.
Figure 4:
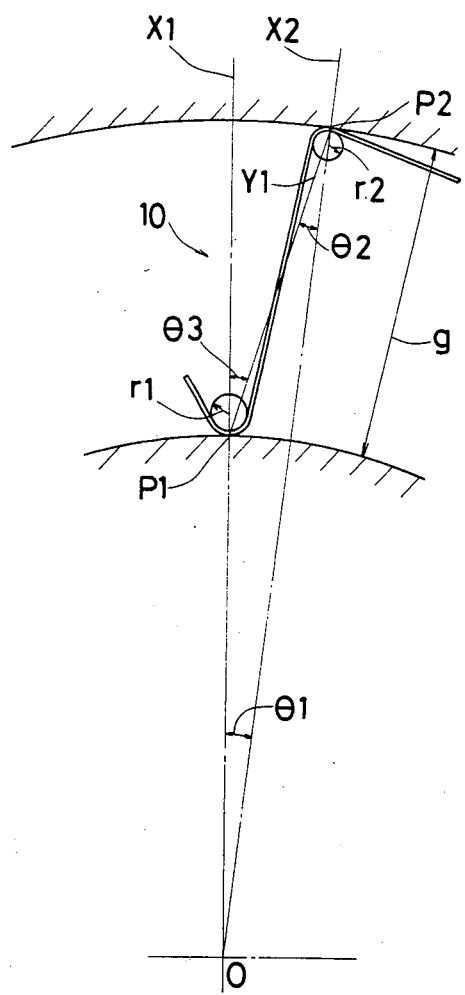
Figure 5:
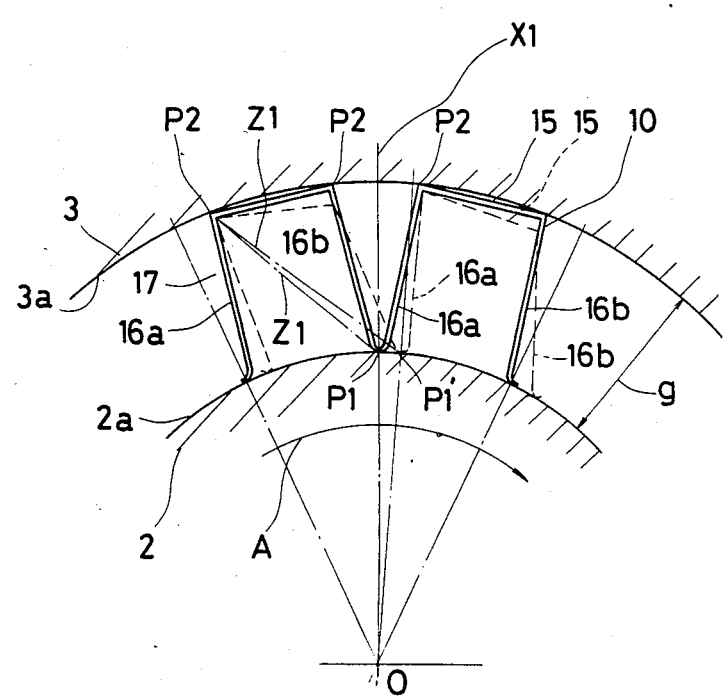
FIGS. 5 and 6 are sectional views showing the function of the U-shaped part of FIGS. 3 and 4.
Figure 6:
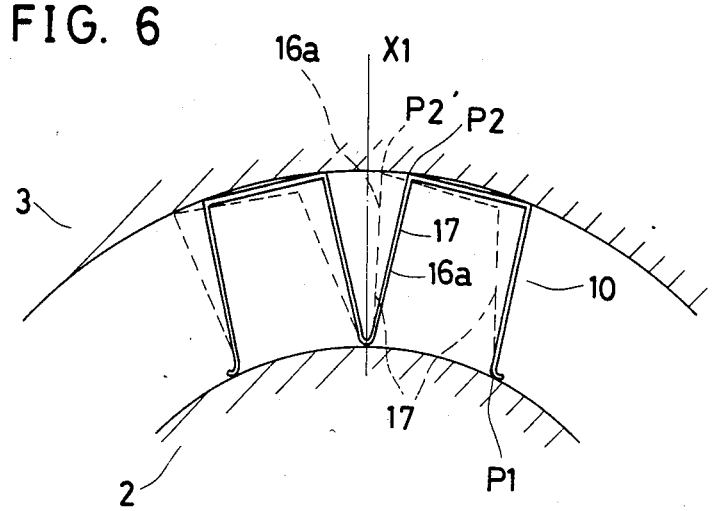

FIGS. 1 to 6 show an embodiment according to the present invention applicable to coupling one member 2, a rotating axis for instance, with another member 3, a gear for instance, to be concentrically coupled with the member 2, the member 2 being inserted movable into a through hole 3b on the member 3 and held therein concentrically, permitting relative rotational displacement to the left or right before coupling. A circular hole 3c for interpositioning a coupling 1 is provided to the end of the member 3, the inside circumference of the hole 3c constituting an opposing face 3a, and the end of the member 2 constituting an opposing face 2a. The coupling 1 comprises a ringed retainer 4 and coupling members 5 which are comprised by a spring steel plate bent to a V-shape. The retainer 4 has a U-shaped bend 6 which extends in parallel with the axis of the retainer 4 at three positions according to the present embodiment, a bottom piece 7 thereof being provided with a threaded hole 9 for use to remove the coupling. Each coupling member 5 comprises four U-shaped parts 10 at the central part and auxiliary bends 11 at both sides having a width narrower than that of the U-shaped part 10, the lower end of an outside piece 12 of the auxiliary bend 11 being turned up at the lower edge of a side piece 13 of the U-shaped bend 6 of the retainer 4, so that the coupling member 5 is held to the connecting portion which is retainer 4. As shown in FIGS. 3 and 4, the U-shaped part 10 comprises incline pieces 16a and 16b which extend radially downward from both sides of the upper piece 15 inclining with a slight gradient angle, and join each other at the lower end thereof. The length of the incline pieces 16a and 16b is established to be longer than the gap g between the opposed faces 2a and 3a, the joint between the incline pieces 16a and 16b forming a circular arc having a relatively small radius r1, and the corner between the upper piece 15 and the incline pieces 16a and 16b also forms a circular arc r2. Therefore, the U-shaped part 10 is brought into contact with the opposed faces 2a and 3a of the two members 2 and 3 at the intersecting points P1 and P2 where radial lines X1 and X2 passing through the center of each circular arc intersect with the opposed faces 2a and 3a. The gradient of the inclined pieces 16a and 16b is established to make the radial line X1 and the segment of a line Y1 which links the intersections, i.e. the points of contact P1 and P2 between the U-shaped part 10 and oscilatory faces 2a and 3a, have a gradient angle $\theta 3$ relatively close to but not exceeding the so called friction angle between the opposed faces 2a and 3a and the coupling members 5. The incline pieces 16a and 16b, according to the present embodiment, comprise a wedge part 17 that wedges the opposed faces 2a and 3a.

It may be added that the sum of the intersecting angle $\theta 1$ between the radial line X1 and X2 and the intersecting angle $\theta 2$ between the radial line X2 and segment Y1 equals the gradient angle $\theta 3$. Furthermore, each of the incline pieces 16a and 16b respectively has the identical gradient angle $\theta 3$, and therefore, each U-shaped part 10 is lineally symmetrized about the radial line X1.

As shown in FIG. 2, the coupling 1 according to the present invention is, therefore, inserted with the retainer 4 inside between the opposing faces 2a and 3a on two members 2 and 3 which are arranged concentrically to permit relative rotational displacement to the left or right, keeping the identical gap g. The member 3 is then loaded and the member 2 which is a rotatory axis is turned clockwise as shown by an arrow, when the point of contact P1 shifts to P1' as if the incline piece 16a were raised up with the point of contact P2 as a momentary axis of rotation, namely the incline piece 16a is moved inclined to the direction where the gradient angle $\theta 3$ decreases in proportion to the load and the point of contact P1 shifts to P1' by a strain and like due to Herz stress at the points of contact P1 and P2. The length of the incline piece 16a or the wedge part 17, i.e. the distance between the points of contact P1 and P2, is established longer than the gap g even after the displacement, and therefore, the gradient angle $\theta 3$, having a desirable friction angle narrower than first established, is capable of wedging the opposed faces 2a and 2b, and as a result the members 2 and 3 are coupled to make the member 3 turnable. It may be added that when the point of contact P1 moves to the point of contact P1' as the incline piece 16a is raised up, the upper piece 15 and the other incline piece 16b open in a dog leg shape as shown by a broken line in FIG. 5, which extends the distance between the points of contact P1 and P2 on the diagonal line Z1 of the U-shaped part 10 so that free displacement of the point of contact P1 to the point of contact P1' is made possible. If the member 2 is turned in the reverse direction or counter clockwise, deformation becomes a line of symmetry about the broken line and radial line X1 shown in FIG. 5. Furthermore, as shown by a broken line in FIG. 6, if the member 3 is turned counter clockwise, the point of contact P2 moves to P2' with the point of contact P1 as a momentary axis of rotation, deforming the U-shaped part 10, so that the wedge part 17 which is comprised of the incline piece 16a is capable of impeding relative rotational displacement and of coupling both together.

Figure 7:
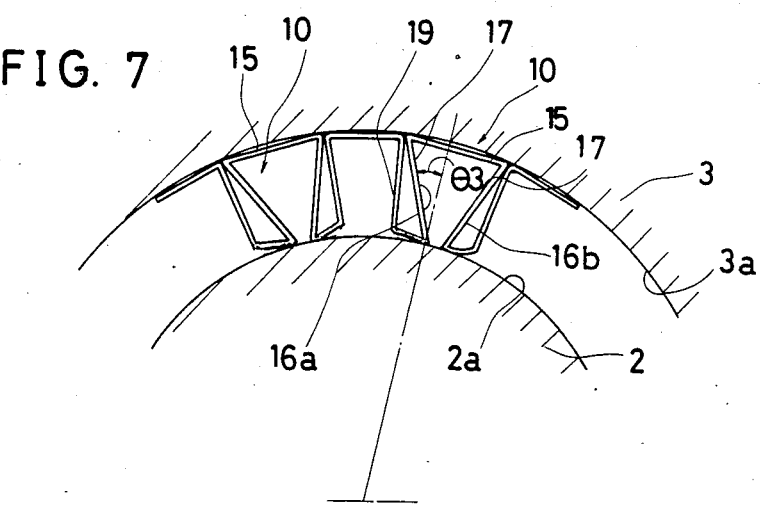
FIG. 7 is a sectional view showing another embodiment of the invention.

Thus, if a spring steel plate is used, for instance, to make the coupling member 5, extremely easy processing is readily available for providing a coupling that can be manufactured economically. Furthermore, random thickness of the steel plate, the number of the U-shaped parts 10, and measurement of the width can be freely established depending on the transmission torque, so that the gradient angle $\theta 3$ keeps the friction angle larger than zero. Still further, the spring steel plate can be substituted by a wire rod. As shown in FIG. 7, the U-shaped part 10 may be formed into wedge parts 17 comprising the incline pieces 16a and 16b which have the narrowing width inwardly along the radial direction. The lower ends of the incline pieces 16a and 16b in this instance, are connected to the upper piece 15 via the bent half piece 19.

Figure 8:
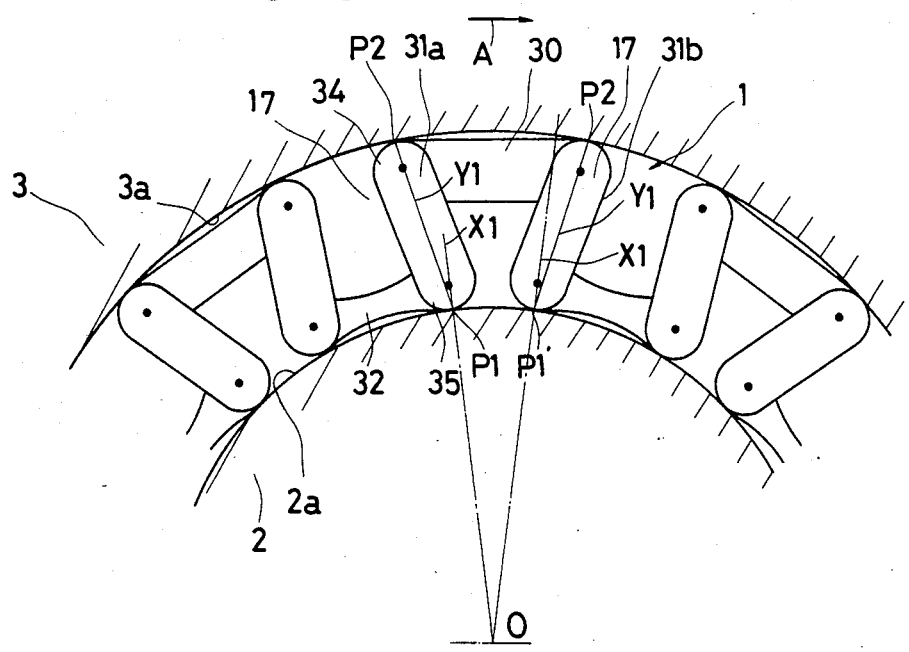
FIG. 8 is a sectional view showing still another embodiment of the invention.
Figure 9:
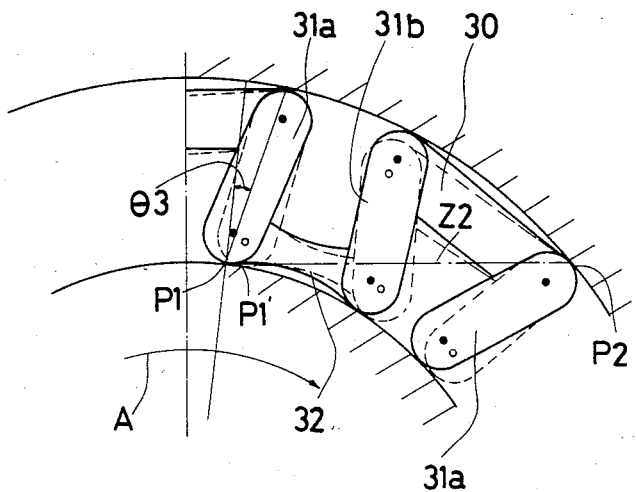
FIGS. 9 and 10 are sectional views showing the function of FIG. 8.
Figure 10:
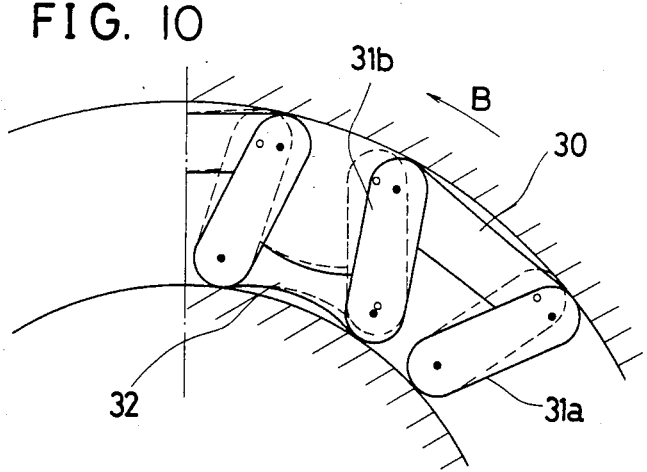
Figure 11:
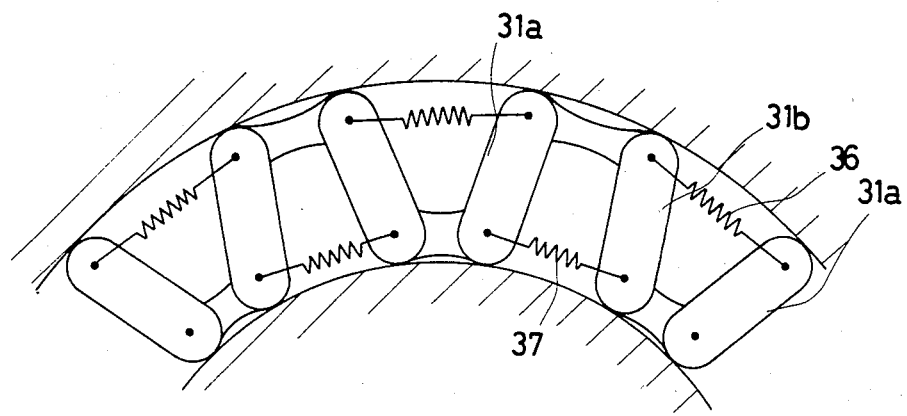
FIGS. 11 and 12 are sectional views showing another embodiment of the invention.
Figure 12:
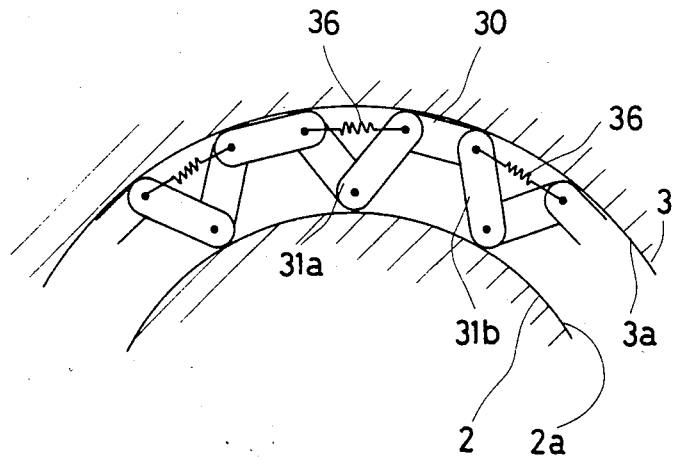

FIGS. 8 to 10 show another embodiment of the present invention, wherein the coupling 1 comprises chained links. The coupling 1 is an endless chain comprising an upper bending link 30, incline links 31a and 31b and a lower binding link 32, the incline links 31a and 31b constituting the left and right wedge part 17 and the binding links 30 and 32 comprising the connecting portions. The coupling 1 is fit in flection between the opposed faces 2a and 2b so that the upper binding link 30 is positioned on the side of the opposed face 3a of the member 3 and the lower binding link 32 on the side of the osculatory face 2a of the member 2, whereby the circular arcs 34 and 35 which are formed at the upper and lower ends of said incline links 31a and 31b osculate the respective opposed faces 2a and 3a at the points of contact P1 and P2. The incline links 31a and 31b in this case are symmetrically set to spread out upward. Furthermore, the radial line X1 linking the center O and the point of contact P1 of the member 2, and the segment Y1 linking the points of contact P1 and P2, are arranged to incline with an angle smaller than but relatively close to the friction angle. Therefore, as shown in FIG. 9 by a broken line, if the member 3 is turned clockwise (an arrow A), the incline link 31a which moves inclined to the uprising side wedges the member 2 and 3. The other incline link 31b permits free displacement of the point of contact P1, since together with the upper link 30 the binding link 32 increases its gradient angle when the point of contact P1 moves to the point of contact P1', shortening as a result the segment Z2 which links the point of contact P1 with the point of contact P2 of the adjacent link. Further, the case of turning the member 3 counter clockwise as per the arrow B is shown in FIG. 10. In addition, as shown in FIG. 11, in order that the incline links 31a and 31b gather momentum toward the uprising side, springs 36 and 37 may be arranged on the upper and lower sides between the adjacent incline links 31a and 31b. It is also possible to fit the incline links 31a and 31b to the left and right of the upper link 30 with the width between the links narrowing upwards. Further, the binding links 32 may be omitted as shown in FIG. 12.

Figure 13:
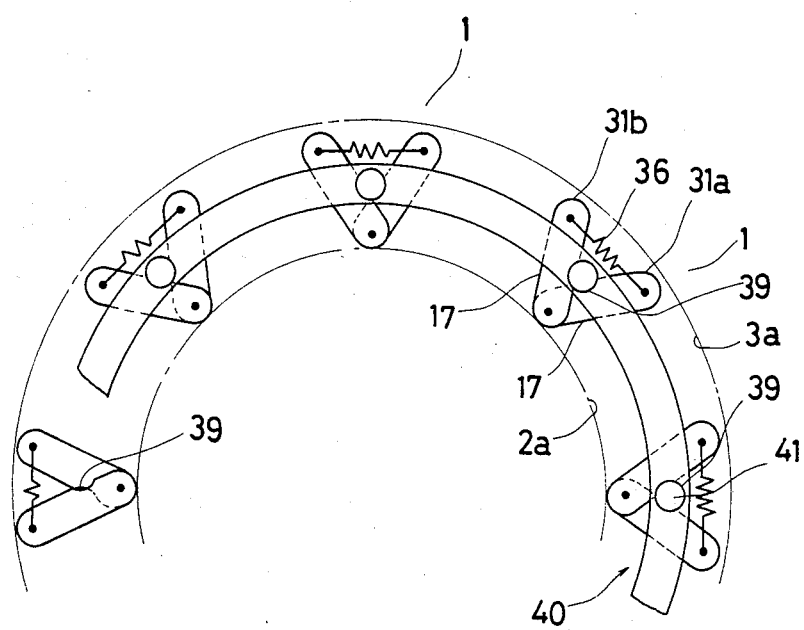
FIG. 13 is a front view showing still another embodiment of the invention.
Figure 14:
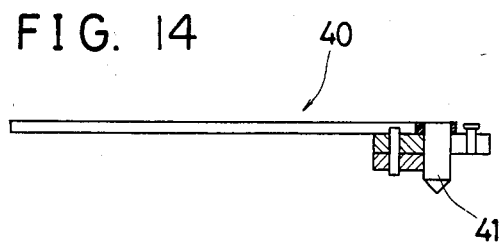
FIG. 14 is a sectional view showing an instance of the inserting tool.
Figure 15:
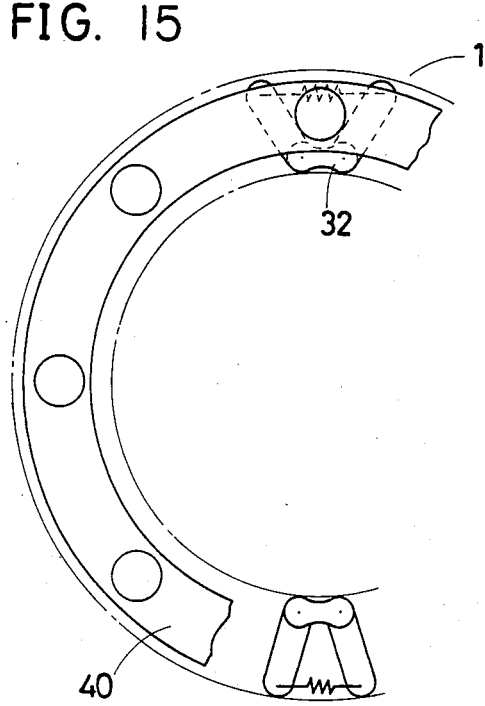
FIG. 15 represents another embodiment of the invention.

FIGS. 13 to 15 show still another embodiment according to the present invention, wherein the coupling 1 has a pair of wedge part 17 which can be independently inserted into a suitable place between the opposed faces 2a and 3a. FIGS. 13 and 14 show that the wedge parts 17 are comprised by two incline links 31a and 31b pivotted at the end thereof through the connecting pin that is a connecting portion. A spring 36 is provided to the upper end of the incline links 31a and 31b giving momentum toward the uprising side. Said coupling 1 being suitably set between the opposed faces 2a and 3a, can couple the both with the wedge part 17 which is comprised by the incline piece 31a or 31b on the side uprising due to relative rotational motion. Further, the coupling 1 can be inserted for fitting between the opposed faces 2a and 3a by means of outstretching the coupling 1 by inserting a detent pin 41 which is arranged at regular intervals on the insertion tool 40, into a concave 39 which is provided to the inside surface of the incline pieces 31a and 31b, the insertion tool 40 being pulled off after insertion of the coupling 1.

Further, the incline links 31a and 31b may be pivotted, as shown in FIG. 15, to the both ends of the binding link 32, and fitting may be executed using the similar insertion tool 40.

Figure 16:
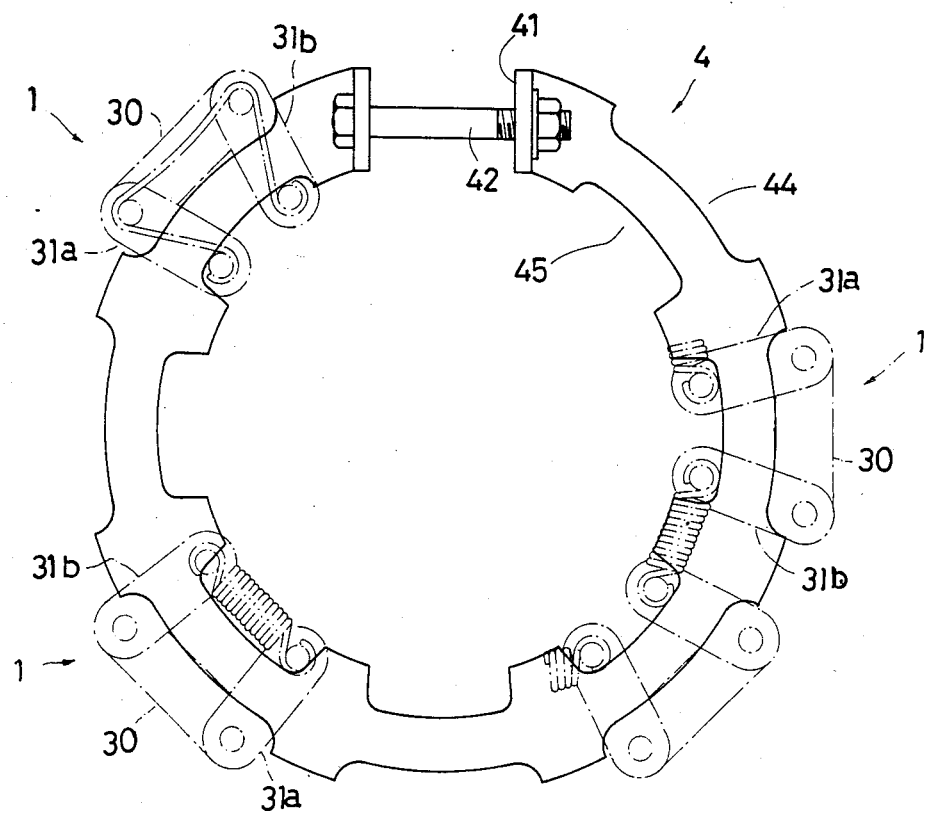
FIG. 16 is a front view showing another instance of a retainer together with the coupling.
Figure 17:
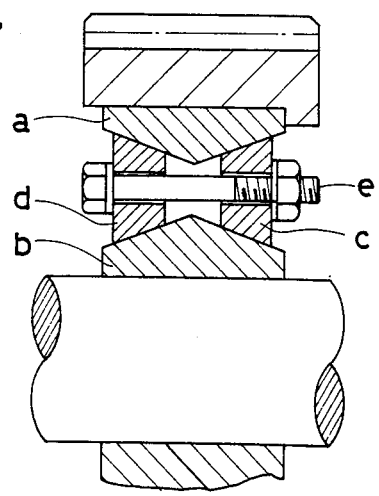
FIG. 17 is a partially sectional view showing an instance of a coupling of a prior art.

In addition, in the embodiment shown in FIGS. 15 to 17, as described above, the incline links 31a and 31b comprise the wedge part 17 which couples the both members by impeding relative rotational displacement.

FIG. 16 shows another example of a retainer, wherein the retainer 4 comprises a ringed flat plate which is provided with a right-angled bend 41 at the broken part. The retainer 4 can be fixed to and is prevented from slipping off the member 2 by binding the bolt 42 which passes through the bent 41. Further, the retainer 4 is provided with cut-away checks 44 and 45, and the upper link 30 is inserted into the upper check 44. The drawing shows fitting of three different types of couplings 1. The incline links 31a and 31b of any of the coupling 1 hold the upper link 30, holding at the same time the retainer 4 and are arranged on the both sides thereof. The lower end thereof is placed in the lower check 45. Thus, the coupling 1 is fit to the retainer 4 for fitting to the member 2 and 3 in one body.

As disclosed above in detail, the coupling according to the present invention comprises the wedge parts at left and right on the opposed faces of two members, free to be relatively displaced, inclining to said opposed faces with an angle below the friction angle so as to wedge the both by uprising, capable of being fit between the osculatory faces merely by insertion, which, requiring no processes such as key seating or splining or like, not only improves the efficiency of production but causes no lowering of the material strength of the members, and in addition, is favorably applicable even if one member is a hollow pipe of a thin wall. The coupling is accurately and easily installed since the wedge parts are connected by the connecting portions. Furthermore, it saves the labor involving phase adjustment or dividing, contributing to simplification of the coupling work. Also, fitting strength is controllable by establishing at random the number, shape, width measurement, rigidity, etc. of the wedge part, appreciably improving the productivity and the efficiency of operation to the benefit of saving the cost of fixed operation as compared to forced fit, or shrinkage fit, or like. Additionally, by comprising a coupling with a spring steel plate or wire rod, the cost of production and material can be further decreased on the one hand, and on the other, suitable spring force and buffer effect can be provided to the two members when coupling them. In addition to the aforementioned spring steel plate, and link body, the coupling of the present invention provides application of a wedge part in a variety of composition so far as it is capable of wedging the both relative directions to the left and right. Furthermore, in addition to application to the members accompanying relative rotational displacement, the coupling of the present invention may be provided for coupling two members which displace in parallel by means of arranging the wedge parts on the left and right in the direction of said paralleling relative displacement.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A coupling for fastening two members having opposing faces kept at an equal gap and free to relatively displace to the left or right, characterized in that wedge parts inclining at an angel narrower than the friction angle to osculate each of said opposing faces of said members, are capable of wedging said opposing faces by relative displacement of said respective members toward the rising side of said wedge parts, arranged on the left and right respectively in the direction of relative displacement of said respective members, said wedge parts being connected by connecting portions, and wherein said wedge parts are U-shaped and comprise inclining pieces extending inward in a radial direction with a narrow gradient angle, provided on the both sides of a upper piece of said U-shaped part, said wedge being made of a spring steel plate.

* * * * *